US012287747B2

(12) United States Patent
Hustava

(10) Patent No.: US 12,287,747 B2
(45) Date of Patent: Apr. 29, 2025

(54) FAST DEVICE REINITIALIZATION ON DSI3 BUS

(71) Applicant: SEMICONDUCTOR COMPONENTS INDUSTRIES, LLC, Phoenix, AZ (US)

(72) Inventor: Marek Hustava, Bratislava (SK)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 168 days.

(21) Appl. No.: 18/162,972

(22) Filed: Feb. 1, 2023

(65) Prior Publication Data

US 2024/0061800 A1 Feb. 22, 2024

Related U.S. Application Data

(60) Provisional application No. 63/399,311, filed on Aug. 19, 2022.

(51) Int. Cl.
*G06F 13/40* (2006.01)
(52) U.S. Cl.
CPC .................. *G06F 13/404* (2013.01)
(58) Field of Classification Search
CPC ...... G06F 13/38; G06F 13/36; G06F 13/4291; G06F 13/404
See application file for complete search history.

(56) References Cited

U.S. PATENT DOCUMENTS

| 10,756,925 B2 | 8/2020 | Hustava et al. | |
|---|---|---|---|
| 2012/0221755 A1* | 8/2012 | Schultz | G06F 13/4252 710/110 |
| 2012/0243559 A1* | 9/2012 | Pan | H04J 3/1605 370/503 |
| 2018/0115409 A1* | 4/2018 | Nayyar | G01S 13/343 |
| 2018/0121381 A1 | 5/2018 | Podsiadlo et al. | |
| 2019/0219294 A1* | 7/2019 | Dutt | G05B 19/0421 |

(Continued)

FOREIGN PATENT DOCUMENTS

| CN | 108737590 A | 11/2018 |
|---|---|---|
| DE | 102022102195 A1 | 8/2022 |

OTHER PUBLICATIONS

Denso Corporation, Freescale Semiconductor Inc. and TRW Automotive Inc., "DSI3 Bus Standard," Revision 1.00, Feb. 16, 2011, 45 pages.

(Continued)

*Primary Examiner* — Phong H Dang
(74) *Attorney, Agent, or Firm* — Ramey LLP

(57) ABSTRACT

Accordingly, there is disclosed herein host device and bus communication method that enables fast sensor device reinitialization that minimizes outage time associated with an unexpected device reset. One illustrative bus communication method includes: providing each of one or more slave devices with a dynamically-determined bus address; querying each of the dynamically-determined bus addresses to obtain a unique device identifier associated with that dynamically-determined bus address; receiving a sequence of data frames each having time-division multiplexed data from the one or more slave devices; and between data frames in the sequence, checking to determine whether any of the one or more slave devices has been reset.

16 Claims, 3 Drawing Sheets

(56) References Cited

U.S. PATENT DOCUMENTS

| | | | |
|---|---|---|---|
| 2020/0084834 A1* | 3/2020 | Knoop | H04W 84/20 |
| 2021/0216490 A1 | 7/2021 | Kumar et al. | |
| 2022/0327077 A1* | 10/2022 | Teferi | G06F 9/321 |
| 2024/0015646 A1* | 1/2024 | Amir | H04W 52/0229 |

OTHER PUBLICATIONS

MIPI Alliance, Specification for I3CSM, Improved Inter Integrated Circuit, Version 1.0, Dec. 23, 2016, 197 pages.

Search Report for counterpart German Patent Application No. 10 2023 120 423.8, dated Jun. 3, 2024, 9 pages.

* cited by examiner

| SENSOR ID | DEVICE-LEVEL TRACEABILITY CODE |
|---|---|
| 0x01 | 012345 6789 ABCD EF0123456 789012 3456 7890A BC |
| 0x02 | 012345 6789 ABCD EF0123456 789012 3456 78010 13 |
| 0x03 | 012345 6789 ABCD EF0123456 789012 3456 78011 2E |
| 0x04 | 012345 6789 ABCD EF0123456 789012 3456 78029 F7 |
| 0x05 | 012345 6789 ABCD EF0123456 789012 3456 7802A 54 |
| 0x06 | 012345 6789 ABCD EF0123456 789012 3456 7802B 9D |

FAST DEVICE REINITIALIZATION ON DSI3 BUS

CROSS-REFERENCE TO RELATED APPLICATIONS

The present application claims priority to Provisional U.S. App. 63/399,311, filed 2022 Aug. 19 and titled "Fast Device Reinitialization on DSI3 Bus" by inventor Marek Hustava. The present application further relates to U.S. application Ser. No. 16/359,693, filed 2019 Mar. 20 and titled "Slave device enhancing data rate of DSI3 bus" by inventors Marek Hustava, Tomas Suchy, Lukas Vykydal, and Pavel Hartl. The foregoing applications are hereby incorporated herein by reference in their entireties.

BACKGROUND

Current and future vehicles are incorporating increasing numbers of on-board sensors and systems to enable or aid critical vehicle functions including Adaptive Cruise Control (ACC), Parking Assistance, Forward Collision Warning (FCW), Forward Collision with Active Braking, Blind Spot Warning (BSW), Lane Keeping Systems (LKS), and others. These technologies provide direct driver assistance in normal driving and critical scenarios, and some are even capable of enhancing driver control or providing autonomous control to prevent or mitigate a crash or negative outcome.

To accommodate the many sensors, actuators, and control systems being employed for such features, manufacturers are implementing increasingly sophisticated data communication networks in each vehicle. The 3rd generation Distributed System Interface (DSI3) standard published by the DSI Consortium (dsiconsortium.org) provides one example of such a communication network. The DSI3 Bus Standard Revision 1.0, published 2011 Feb. 16, is hereby incorporated herein by reference in its entirety.

DSI3 and other communication standards must contend with a unique set of circumstances that challenge their performance. The networks are portable, battery powered (i.e., low voltage), with wire runs long enough to cause (and to be susceptible to) electromagnetic interference (EMI). The networks should be resistant to vibration effects, yet remain inexpensive and easy to repair. The DSI3 standard has thrived by offering a number of desirable features including single-conductor communication with optionally integrated power delivery. However, the safety standards being developed to certify systems operating in the automotive environment challenge the capabilities of existing sensors and systems relying on the DSI3 and similar communications standards.

SUMMARY

Accordingly, there is disclosed herein host device and bus communication method that enables fast sensor device reinitialization that minimizes outage time associated with an unexpected device reset. One illustrative bus communication method includes: providing each of one or more slave devices with a dynamically-determined bus address; querying each of the dynamically-determined bus addresses to obtain a unique device identifier associated with that dynamically-determined bus address; receiving a sequence of data frames each having time-division multiplexed data from the one or more slave devices; and between data frames in the sequence, checking to determine whether any of the one or more slave devices has been reset.

An illustrative bus master device includes: a driver that drives a downlink signal on a bus signal line; a receive buffer that senses an uplink signal on the bus signal line; and a controller coupled to the driver and receive buffer to implement the foregoing communication method via the bus signal line.

Another illustrative communications method includes: creating a lookup table associating each dynamically-assigned sensor ID with a device-level traceability (DLT) code; before initiating a measurement cycle, querying a default sensor ID for a DLT code; and proceeding with the measurement cycle if the query times out before a response is received.

Each of the foregoing devices and methods may be employed individually or conjointly, and they may further employ one or more of the following optional features in any suitable combination: 1. said checking includes attempting to retrieve a unique device identifier from default bus address. 2. responsive to said attempting, receiving a unique device identifier of a reset slave device. 3. determining a dynamically-determined bus address previously associated with the unique device identifier of the reset slave device, and configuring the reset slave device with its previously associated dynamically-determined bus address. 4. said configuring includes writing register data to the default bus address. 5. said register data includes additional configuration data for the reset slave device. 6. writing additional configuration data to the previously associated dynamically-determined bus address after said configuring and before receiving a subsequent data frame in said sequence. 7. a next data frame in the sequence is initiated when a timeout results from said checking. 8. if a response to the query is received, using the lookup table to find a reset sensor ID associated with a DLT code received in a response to the query and sending reconfiguration information associated with the reset sensor ID to the default sensor ID, the reconfiguration information including at least the reset sensor ID. 9. sending one more measurement configuration parameters to the reset sensor ID after sending the reconfiguration information and before proceeding with the measurement cycle.

DETAILED DESCRIPTION

The attached drawings and following description set out particular embodiments and details for explanatory purposes, but it should be understood that the drawings and corresponding detailed description do not limit the disclosure. On the contrary, they provide a foundation that, together with the understanding of one of ordinary skill in the art, discloses and enables all modifications, equivalents, and alternatives falling within the scope of the appended claims.

Figure 1A:
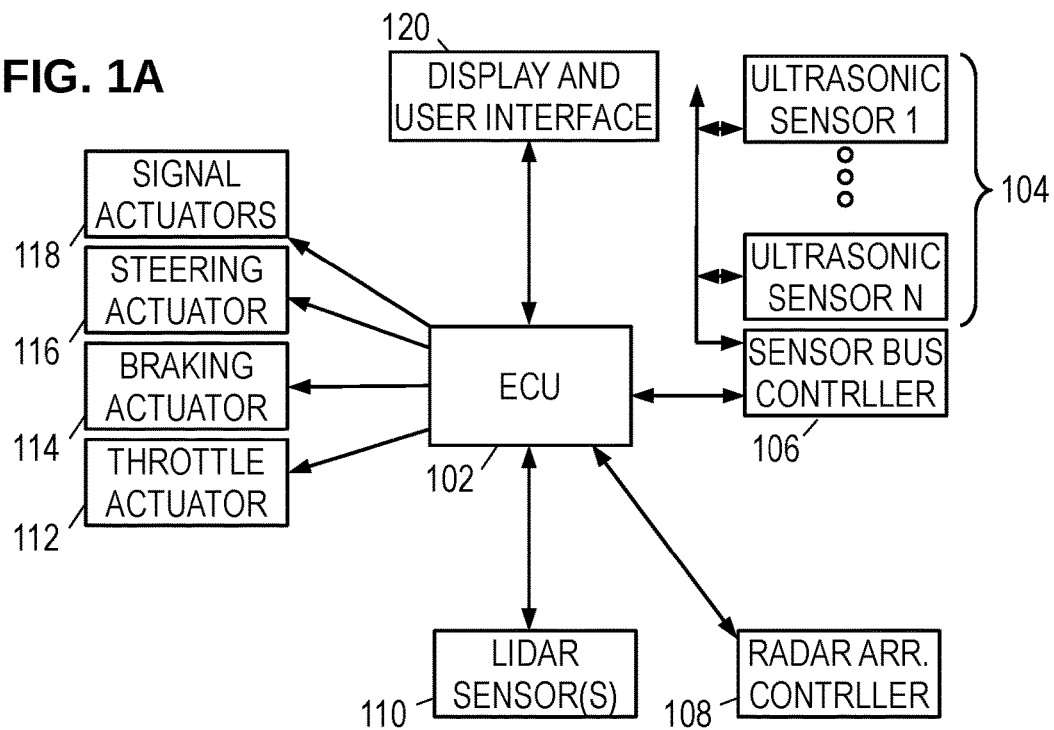
FIG. 1A is a block diagram of an illustrative data communication network.

FIG. 1A shows an electronic control unit (ECU) 102 coupled to the various ultrasonic sensors 104 via a sensor bus controller 106, a radar array controller 108, a LIDAR sensor 110, and a set of actuators such as a throttle actuator 112, a braking actuator 114, a steering actuator 116, and turn-signal actuators 118. ECU 102 may further couple to a user-interactive interface 120 to accept user input and provide a display of the various measurements and system status.

The various sensors emit ultrasonic pulses, electromagnetic waves, and coherent beams; receive corresponding reflections to measure reflector distances; and collect the measurements to determine a spatial relationship of the vehicle to its surroundings. ECU 102 may employ these measurements and internal measurements of the vehicle's orientation and motion to provide automated parking, assisted parking, lane-change assistance, obstacle and blind-spot detection, autonomous driving, and other desirable features.

Various standards exist to support communications between the ECU 102 and the various sensors and actuators. Of particular interest with respect to the present disclosure is the 3rd generation Distributed System Interface (DSI3) bus standard, which provides for half-duplex single-ended signal communication between a bus master device (typically the ECU) and one or more slave devices (e.g., the sensors and actuators). Because the DSI3 bus requires only one signal conductor, it may at times be referred to as a "one-wire" bus.

Figure 1B:
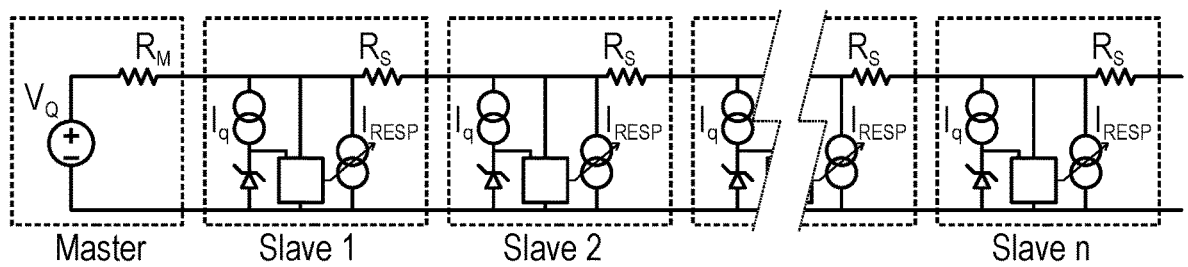
FIG. 1B is a schematic model of an illustrative daisy-chain arrangement of sensors on a DSI3 bus.

FIG. 1B is a schematic model of a daisy-chain arrangement. As set forth in section 6.3.3 of the DSI3 standard, the bus enters a Discovery Mode shortly after power-on to perform an iterative address assignment process that assigns each device a unique address corresponding to their position in the daisy chain, thereby enabling the slave devices to avoid bus collisions when responding to the bus master. When the Discovery Mode is complete, the slave devices use the addresses to determine their slot for communicating responses (such as measurement results) within a time-division multiplexed frame.

Figure 2A:
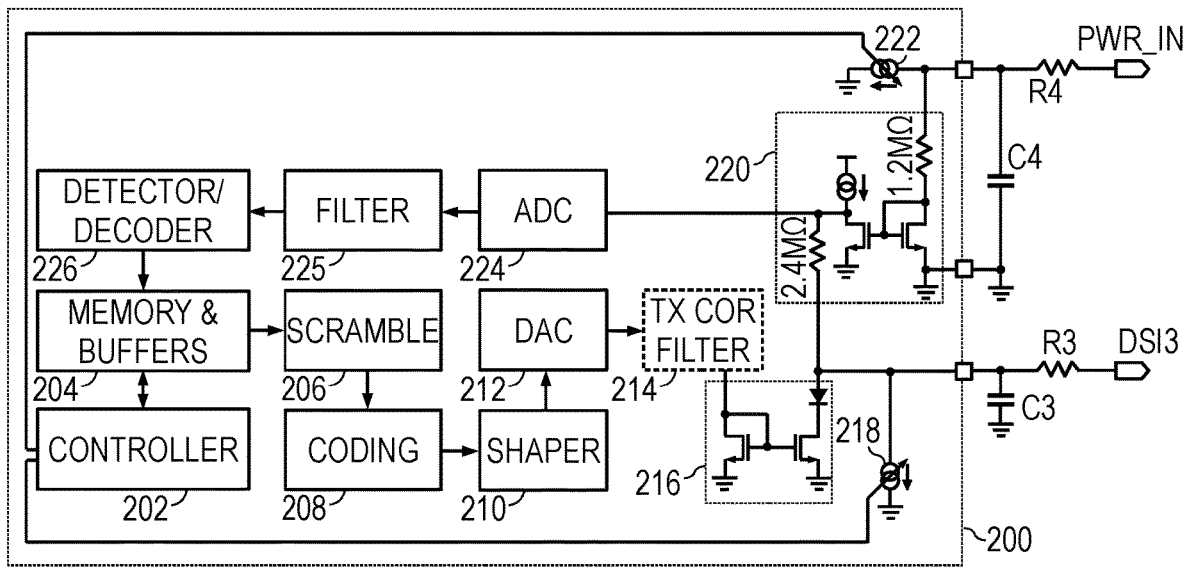
FIG. 2A is a block diagram of an illustrative slave device for a DSI3 bus.

FIG. 2A is a block diagram of an illustrative slave device 200 suitable for use on a standard DSI3 bus. While maintaining physical compatibility with the DSI3 standard, the illustrative device 200 may include certain features to enhance system performance, at least some of which extend the standard in a way that may necessitate a firmware adjustment in the bus master device as discussed further below.

Slave device 200 includes a controller 202 that collects measurements and buffers relevant messages in memory 204 for communicating the measurement data to the bus master device. While the message length can be varied, in at least one contemplated embodiment each message is 16 bytes and may begin with or be preceded by a preamble that is one or two nibbles in length. An optional scrambler 206 masks each message with a pseudorandom binary sequence using a bitwise exclusive-or (XOR) operation to randomize or "whiten" any repeating data patterns. If present, the preamble is not masked, so as to preserve the preamble pattern in the scrambler's output bitstream. The seed for the pseudorandom sequence may vary for each message and may vary for each slave device.

A channel encoder 208 encodes the bitstream from the scrambler 206 by mapping each nibble to a corresponding triplet of channel symbols. Each triplet includes three ternary channel symbols. Channel symbols are also referred to herein as "chips" and are transmitted as one of three unipolar non-return-to-zero levels: 0, 1, or 2, each symbol having a fixed symbol duration which may be about 3 or 4 microseconds. As provided in the standard, "0" may correspond to a quiescent channel signal current of $I_Q$. A "1" may correspond to a response channel signal current of $I_Q+I_{RESP}$, and a "2" may correspond to a response channel signal current of $I_Q+2I_{RESP}$. In at least some embodiments, $I_Q$ is limited to no more than 2 mA, and $I_{RESP}$ is approximately 12 mA. Some contemplated embodiments may switch from three-level signaling to two level signaling to improve noise immunity. In such embodiments, the channel encoder 208 maps 8-bit bytes to 8-bit codewords, in this case only $I_Q$ and $I_Q+2I_{RESP}$ current levels are used.

An optional pulse-shaping filter 210 may operate on the channel symbol stream from the encoder 208, providing a transfer function that converts rectangular pulses (e.g., NRZ chips) into smoother pulse shapes that provide the channel signal with more desirable spectral properties. A digital-to-analog converter 212 operates on the filtered channel signal to convert it from digital form to analog form, which herein may be termed the uplink channel signal. An optional transmit correction filter 214 may operate on the uplink channel signal to limit signal energy in one or more frequency ranges where EMI emissions are restricted.

A channel driver 216 converts the uplink channel signal into an electrical current on an input/output pin of the slave device 200. A low pass RC filter (capacitor C3, resistor R3) couples the input/output pin to the signal conductor of the DSI3 bus.

Current biasing of the input/output pin may be provided by a current sink 218 and a receive buffer 220. Controller 202 adjusts the current sink 218 as needed for biasing during the forward (downlink) and reverse (uplink) communication phases of the half-duplex DSI3 communication protocol. During the downlink communication phase, the input/output pin receives a downlink channel signal in the form of an electrical voltage signal. Receive buffer 220 provides a high input impedance for the input/output pin, buffering the downlink channel signal for the analog-to-digital converter 224.

A downlink receive filter 225 may limit the digital receive signal bandwidth and/or enhance signal to noise ratio of the downlink signal. In at least some embodiments, the filter 225 operates to suppress noise above 300 kHz. In system embodiments where the master device employs a transmit correction filter (similar to filter 214 above), the downlink receive filter 225 may include a compensation function to boost downlink signal frequencies up to about 150 kHz, before rolling off to suppress noise at signal frequencies above about 250 or 300 kHz. A symbol detector and decoder 226 operates on the filtered receive signal to determine the command type and associated payload, placing the information in the receive buffer for the controller 202 to use when formulating a response.

Figure 2B:
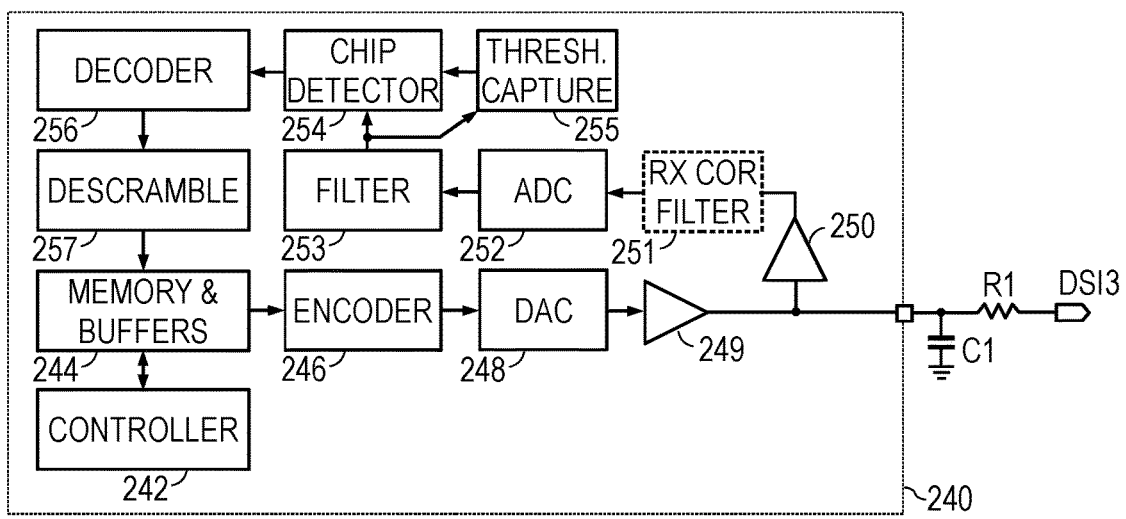
FIG. 2B is a block diagram of an illustrative master device for a DSI3 bus.

FIG. 2B is a block diagram of an illustrative bus master device 240 suitable for use on a standard DSI3 bus. As with the slave device 200, the master device 240 maintains physical compatibility with the DSI3 standard, but may include certain features to enhance system performance when employed in conjunction with a compatible slave device.

Master device 240 includes a controller 242 that formulates downlink messages in memory 244 for communication to one or more slave devices. A channel encoder 246 encodes the binary downlink messages by mapping bits 0 and 1 to upward and downward channel voltage transitions as provided by, e.g., Manchester-1 encoding. A digital-to-analog converter 248 converts the encoded signal into an analog downlink signal. A driver 249 supplies the analog downlink signal as a voltage signal to an input/output pin of the master device 240. Though the DSI3 standard provides for a 2 volt swing between "high" and "low" symbol voltages, some contemplated embodiments employ a 4 volt swing to enhance noise immunity. A low pass RC filter (capacitor C1, resistor R1) couples the input/output pin to the signal conductor of the DSI3 bus.

A high impedance receive buffer 250 couples the uplink signal from the input/output pin to an optional receive correction filter 251. The optional receive correction filter 251 may, e.g., boost high frequency content of the uplink signal to compensate for operation of the transmit correction filter 214. An analog to digital converter 252 digitizes the uplink signal, and an uplink receive filter 253 operates on the digital signal to limit signal bandwidth and/or enhance signal-to-noise ratio. Filter 253 may be a matched filter, having a filter response based at least in part on the pulse shape provided by the optional pulse shaping filter 210. Filters 251 and 253 can be re-ordered, merged into a single filter, and each implemented in digital or analog form.

A chip detector 254 operates on the filtered uplink signal to detect channel symbol levels. A threshold capture unit 255 may capture and/or adapt comparator threshold levels for the chip detector 254 based at least in part on the message preambles. A decoder 256 operates on the channel symbol sequence from the chip detector 254, inverting the operation of encoder 208 to map the chip triplets to binary nibbles. An optional descrambler 257 operates on the bitstream from the decoder 256, inverting the operation of the scrambler 206 to extract the message data sent by the slave device. The message data may be stored in memory 244 for analysis and use by controller 242.

Safety standards being developed for advanced driver assistance systems (ADAS) include challenging requirements for tolerating electrostatic discharge (ESD) events within the sensors or other components of the system. As one example of such an event, a passenger touching a sideview mirror may induce an ESD event affecting a blind spot detection sensor positioned within the mirror. At the ESD event voltages for specified for testing, it has been determined that the sensor is likely to be reset by the voltage transient. Such a reset causes the sensor to forget the unique address it was assigned during the discovery process, as well as any measurement configuration information.

With this information loss, the sensor ceases to respond to measurement requests from the ECU or bus master, potentially creating a blind spot within the ECU's spatial awareness. Once multiple measurement cycles have occurred without a response from a given sensor, the ECU may immediately initiate a sensor bus reset, or even a complete system reset, in an effort to correct the issue. The bus reset or system reset causes a substantial break in measurement acquisition, which is highly undesirable.

The present disclosure seeks to prevent such a substantial break in measurement acquisitions using a process that detects the occurrence of a sensor reset and restores the information that the reset sensor device has lost, doing so in less than the duration of a measurement cycle (e.g., about 50 milliseconds) to prevent more than two measurement cycles elapsing without a response from the reset sensor.

Figures 3, 4:
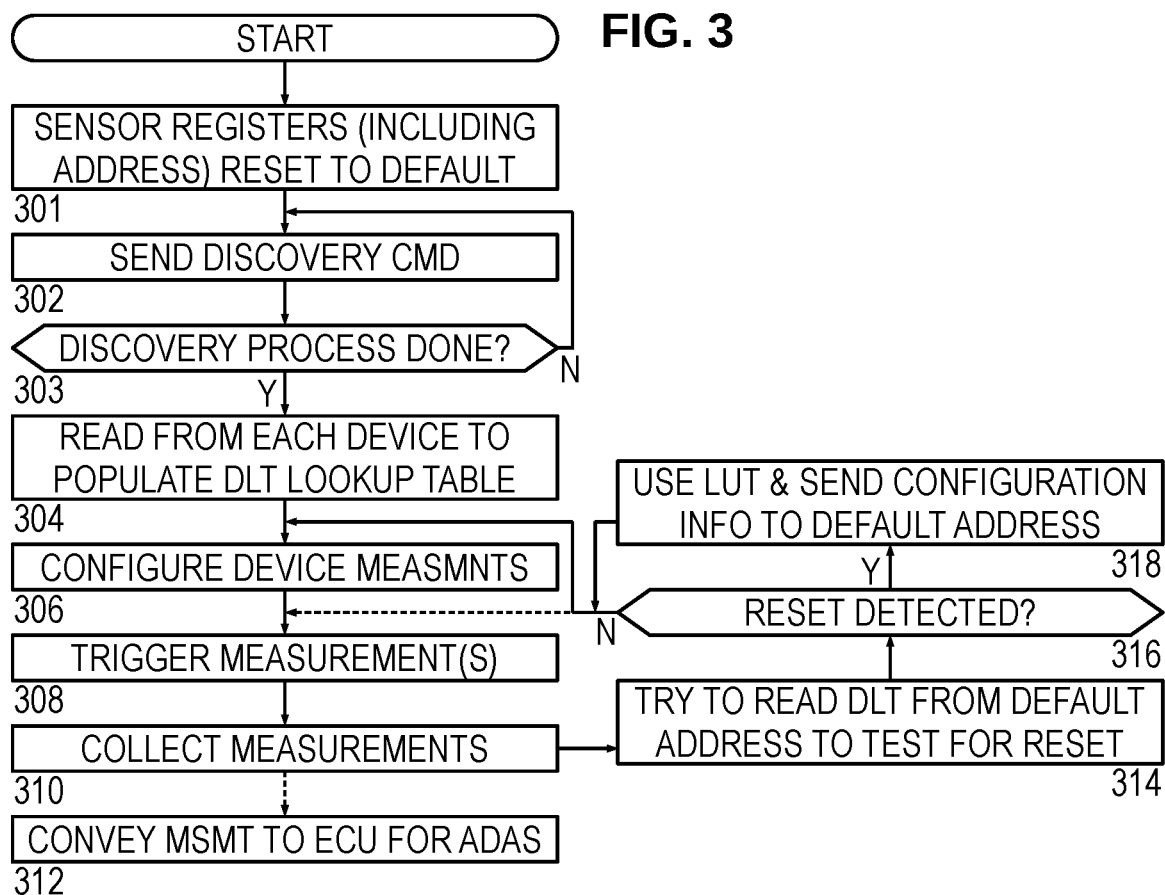
FIG. 3 is a flow diagram of an illustrative sensing method that provides fast slave device reinitialization.
FIG. 4 is an illustrative lookup table associating each sensor ID with a device-level traceability code.

FIG. 3 is a flow diagram of an illustrative sensing method. At power-on (block 301), the registers are reset in each of the sensor devices operating on the DSI3 bus as a slave device, causing their sensor ID ("SID", aka bus address) to default to 0x0. (The "0x" prefix indicates the use of hexadecimal notation.) Blocks 302 and 303 represent an illustrative discovery process in which the ECU and/or bus master periodically sends a discovery command, causing the sensors to iteratively determine their respective positions in the daisy chain (and correspondingly, their bus addresses) through a sequence of current ramping and sensing operations that comply with the DSI3 bus standard or a variant thereof. In block 303, the ECU and/or bus master ends the discovery process only after the number of cycles exceeds the expected number of sensors on the bus.

Variations of the DSI3 standard may employ alternative discovery processes to provide each of the slave devices with a dynamically-determined bus address, e.g., a discovery process in which only one discovery command is used to initiate multiple phases of current boosting corresponding to the number of connected sensors. The unaddressed sensors keep initiating subsequent current ramping phases until each of the sensors has met the requirements for obtaining an address. In any event, the discovery process ensures that each sensor device has a unique bus address in the range from 0x1 to 0xE (typically about six sensors 0x1-0x6 may be supported). Address 0xF is used for broadcast messages and address 0x0 is the default address on reset.

In block 304, the ECU and/or bus master queries each of the dynamically-determined bus addresses to obtain a unique identifier associated with that bus address. A suitable unique identifier would be each sensor's Device-Level Traceability (DLT) code. The ECU and/or bus master populates a look-up table such as that shown in FIG. 4 to associate each dynamically assigned bus address or sensor ID with the unique identifier obtained from that bus address. In block 306, the ECU and/or bus master sends commands to configure the sensor devices for the desired measurements (e.g., setting selected sensors for send & receive while setting other sensors for receive-only, specifying different channels for different sensors, setting measurement range). The sensor devices can be reconfigured before each measurement cycle, or optionally multiple measurements may be acquired for a given configuration.

In block 308, the ECU and/or bus master triggers the sensor measurements, and collects the measurement results from the sensors in block 310, e.g., using a Broadcast Read Command to operate the DSI3 bus in the Periodic Data Collection Mode (a mode in which each slave device sends its data during an allocated time slot within a time-division multiplexed data frame). In block 312, the measurements are conveyed to the ECU for ADAS use (or for whichever feature(s) are being provided).

Before performing a subsequent measurement cycle which may produce its own time-division multiplexed data frame, block 314, the ECU and/or bus master checks whether any of the slave devices has been reset. In at least some implementations, this is done by querying the default sensor ID (0x0) for its unique identifier, e.g., by operating the DSI3 bus in the Command and Response Mode to request the DLT code from the default bus address 0x0. In the absence of a sensor reset, there should be no response to this read command, causing the request to timeout quickly (e.g., less than 2 ms). On the other hand, if a sensor reset has occurred, the reset sensor should respond to this read command, providing its unique identifier. (In the unlikely event that multiple sensors have been reset, their responses will collide, causing a CRC error in the response, which may be taken as an indication that a full bus reset is needed.)

In block 316, the ECU and/or bus master determines whether a response was received. If not, the next measurement cycle begins in block 306 or 308. Otherwise, in block 318, the ECU and/or bus master searches the lookup table for the unique identifier to determine the dynamically-determined bus address previously associated with that unique identifier. Once the correct sensor ID is determined, the ECU and/or bus master sends a block write command to the default sensor ID 0x0 to reconfigure the reset sensor with the lost configuration information and the lost bus address. Alternatively, a first write command may be used to provide the reset sensor with its previously-assigned sensor ID, and a subsequent write command to that sensor ID can be used to reconfigure that sensor appropriately. The next measurement cycle can then be initiated beginning with block 306 or 308.

Blocks 314 through 318 are expected to require less than one measurement cycle (e.g., less than 50 ms) to complete, rendering the sensor fully operable for the next measurement cycle. Even if more time were required, this process could still prevent a system-level reset depending on the threshold number of missing measurements required by the system to initiate such a reset.

In an alternative sensing method, block 314 is omitted. In block 316, a reset is detected if broadcast read command in block 310 elicits no response from one of the sensors. In that case, block 318 is performed, sending suitable configuration information (including the correct bus address) to the sensor with the default bus address.

Numerous modifications, equivalents, and alternatives, will become apparent to those skilled in the art once the above disclosure is fully appreciated. For example, the illustrative methods are shown and described as if they occur in a sequential fashion, but those skilled in the art will recognize that many of the operations can be reordered, pipelined or otherwise performed in parallel, potentially using multiple independent or loosely-coupled hardware components. It is intended that the following claims be interpreted to embrace all such modifications, equivalents, and alternatives where applicable.

What is claimed is:

1. A bus communication method that comprises:
   providing each of one or more slave devices with a dynamically-determined bus address;
   querying each of the dynamically-determined bus addresses to obtain, for each of the dynamically-determined bus addresses, an associated unique device identifier;
   receiving a sequence of data frames each having time-division multiplexed data from the one or more slave devices; and
   between data frames in the sequence, checking to determine whether any of the one or more slave devices has been reset by attempting to retrieve a unique device identifier from a default bus address.

2. The bus communication method of claim 1, further comprising:
   responsive to said attempting, receiving a unique device identifier of a reset slave device.

3. The bus communication method of claim 2, further comprising:
   determining a dynamically-determined bus address previously associated with the unique device identifier of the reset slave device; and
   configuring the reset slave device with its previously associated dynamically-determined bus address.

4. The bus communication method of claim 3, wherein said configuring includes writing register data to the default bus address.

5. The bus communication method of claim 4, wherein said register data includes additional configuration data for the reset slave device.

6. The bus communication method of claim 4, further comprising writing additional configuration data to the previously associated dynamically-determined bus address after said configuring and before receiving a subsequent data frame in said sequence.

7. The bus communication method of claim 1, wherein a next data frame in the sequence is initiated when a timeout results from said checking.

8. The communications method of claim 1, wherein the unique device identifier is a device level traceability (DLT) code.

9. A bus master device that comprises:
   a driver configured to drive a downlink signal on a bus signal line;
   a receive buffer configured to sense an uplink signal on the bus signal line;
   a controller coupled to the driver and the receiver buffer, the controller being configured to implement a communication method via the bus signal line, the method including:
      providing each of one or more slave devices with a dynamically-determined bus address;
      querying each of the dynamically-determined bus addresses to obtain, for each of the dynamically-determined bus addresses, an associated unique device identifier;
      receiving a sequence of data frames each having time-division multiplexed data from the one or more slave devices; and
   between data frames in the sequence, checking to determine whether any of the one or more slave devices has been reset by attempting to retrieve a unique device identifier from a default bus address.

10. The bus master device of claim 9, the communication method further comprising:
    responsive to said attempting, receiving a unique device identifier of a reset slave device.

11. The bus master device of claim 10, the communication method further comprising:
    determining a dynamically-determined bus address previously associated with the unique device identifier of the reset slave device; and
    configuring the reset slave device with its previously associated dynamically-determined bus address.

12. The bus master device of claim 11, wherein said configuring includes writing register data to the default bus address.

13. The bus master device of claim 12, wherein said register data includes additional configuration data for the reset slave device.

14. The bus master device of claim 12, the communication method further comprising writing additional configuration data to the previously associated dynamically-determined bus address after said configuring and before receiving a subsequent data frame in said sequence.

15. The bus master device of claim 9, wherein a next data frame in the sequence is initiated when a timeout results from said checking.

16. The bus master device of claim 9, wherein the unique device identifier is a device level traceability (DLT) code.

* * * * *